Oct. 3, 1961   G. R. CHAPMAN   3,002,790
SILO UNLOADERS
Filed Oct. 16, 1959   3 Sheets-Sheet 2
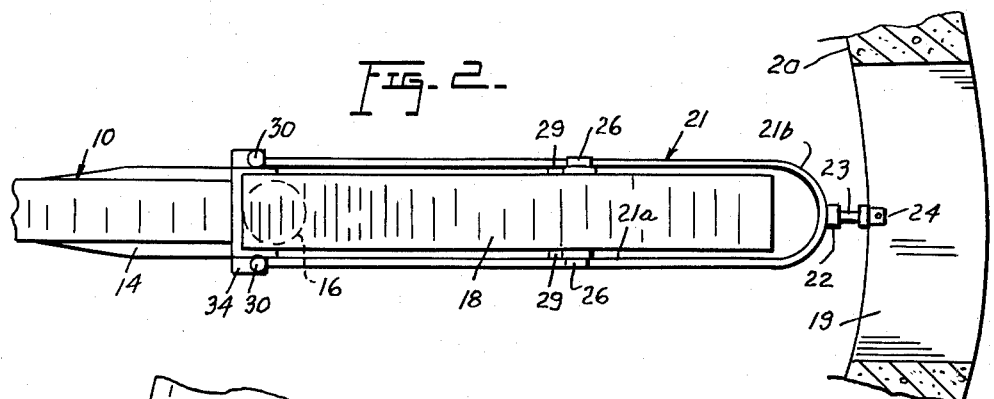
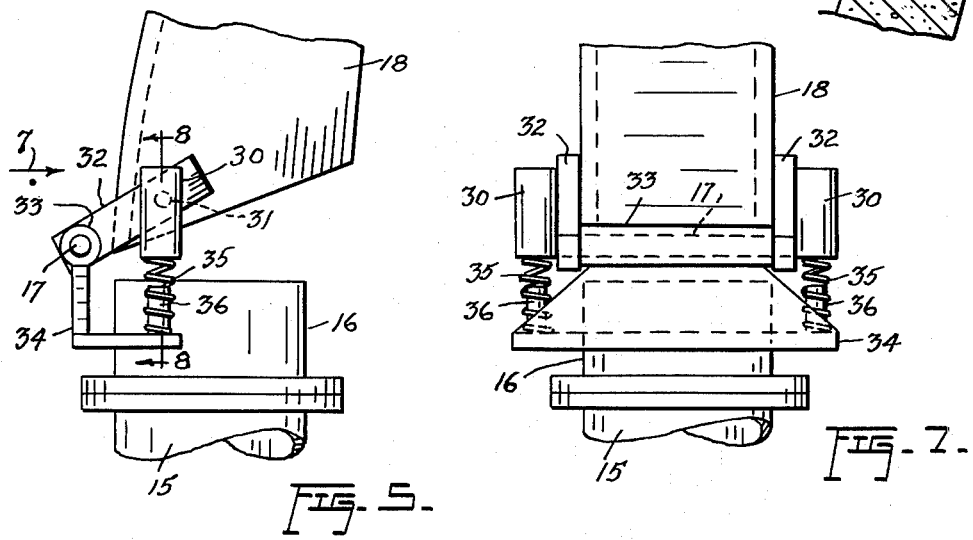
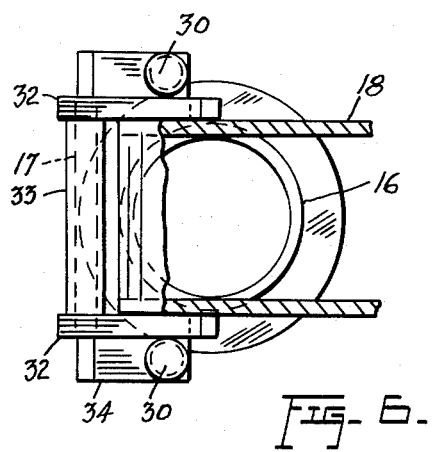
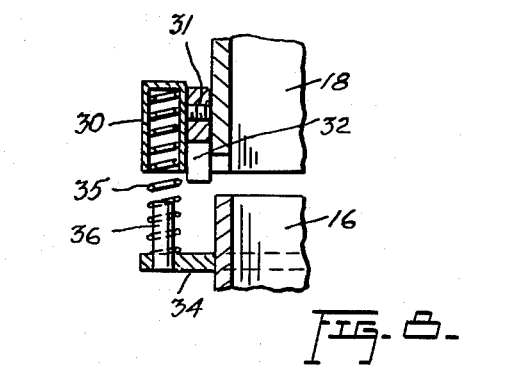
Inventor:
George Roland Chapman
By: *[signature]*
Atty.

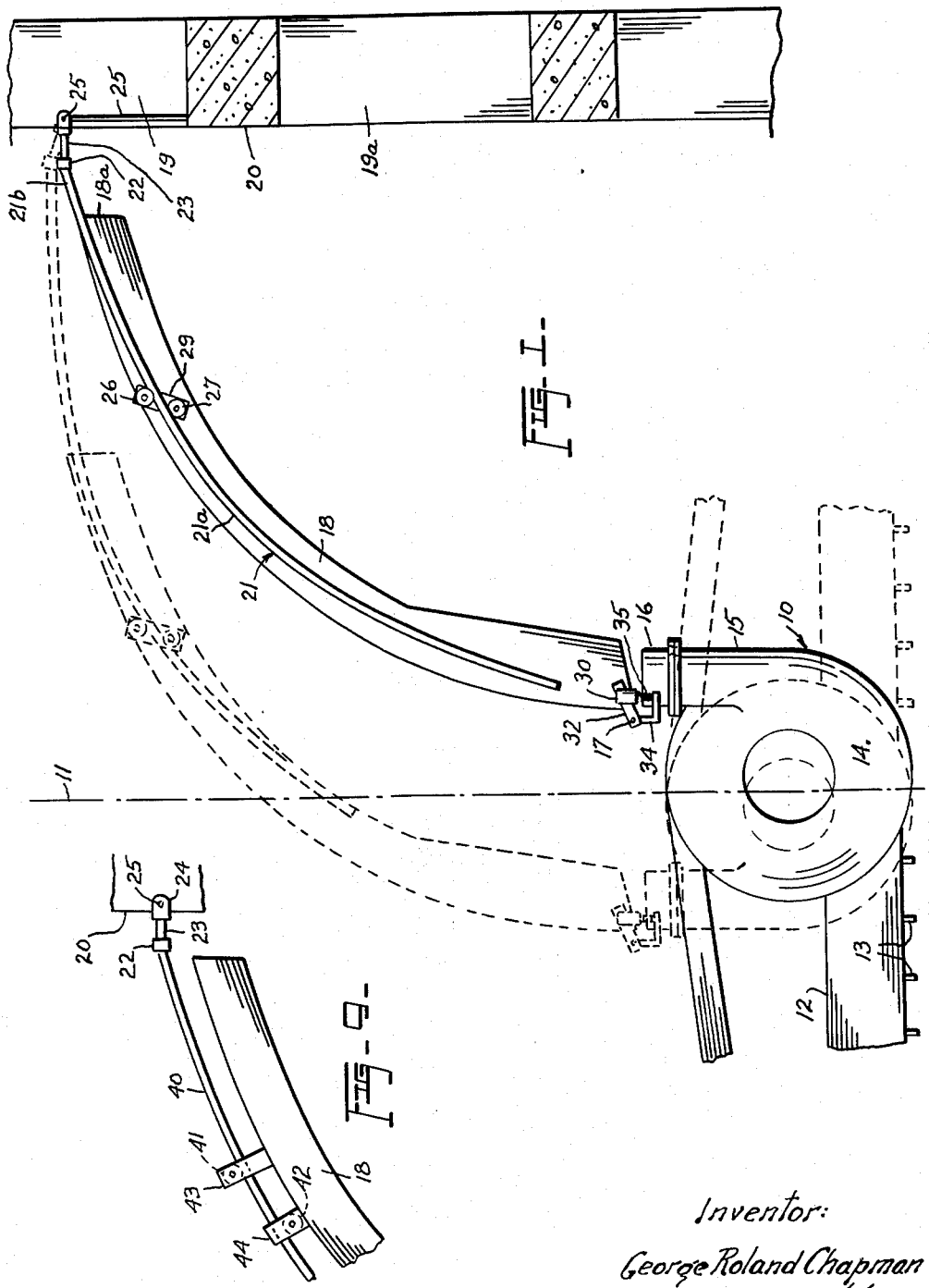

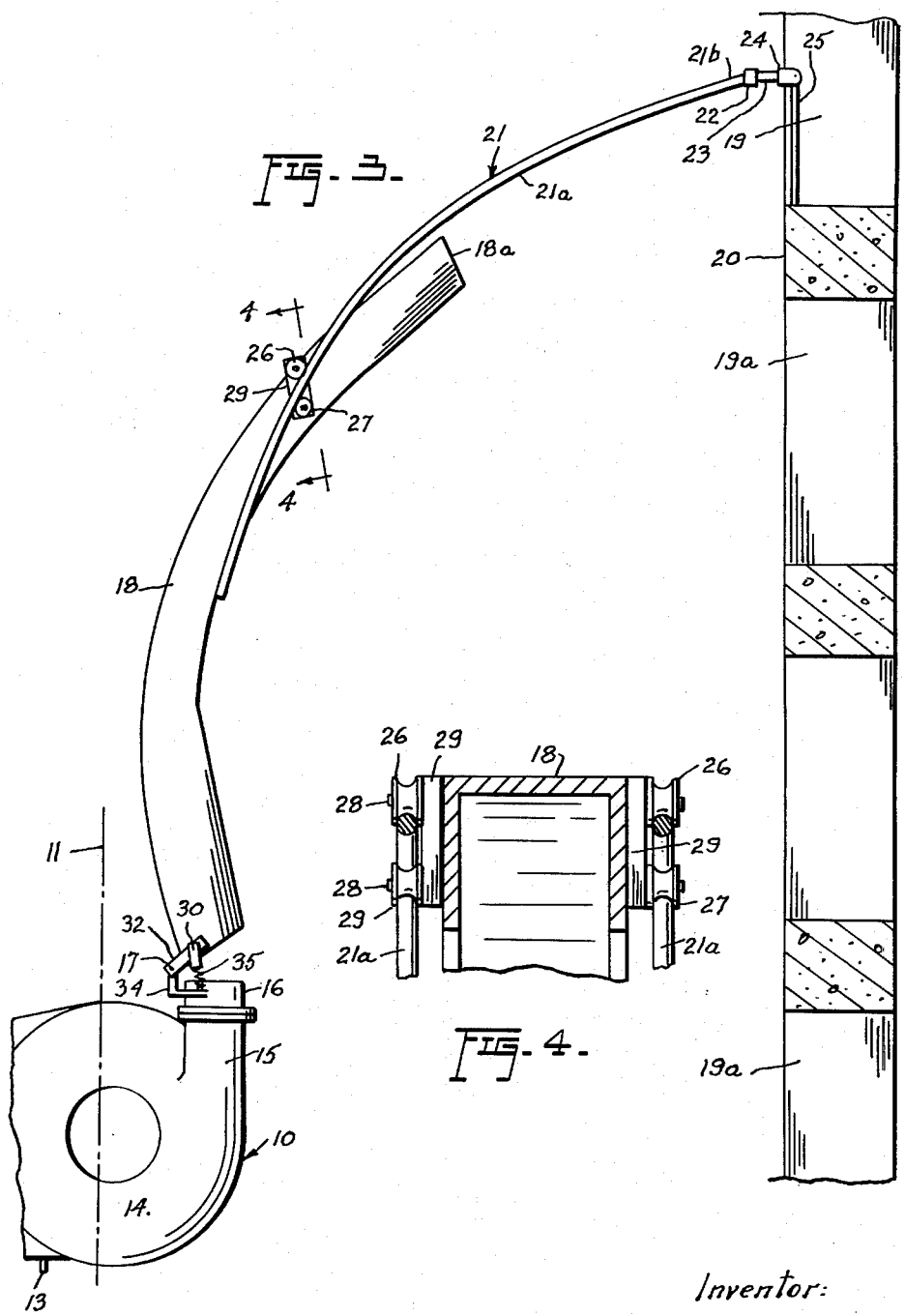

ns="United States Patent Office  3,002,790
Patented Oct. 3, 1961

3,002,790
SILO UNLOADERS
George Roland Chapman, Stafford Road, Palmyra, N.Y.
Filed Oct. 16, 1959, Ser. No. 846,915
8 Claims. (Cl. 302—37)

This invention relates to new and useful improvements in silo unloaders, and in particular the invention concerns itself with the discharge of silage by the unloader through an opening or openings in the lateral wall of the silo.

As such, the invention is well adapted for use in conjunction with unloaders of the type disclosed in my prior Patent No. 2,788,247, dated April 9, 1957, and in my co-pending patent application Serial No. 641,615, filed February 21, 1957, although it is to be understood that the use of the present invention is by no means limited thereto and that the invention may be used generally with unloaders of such type. These unloaders are adapted to rest upon and operatively engage silage in a silo, revolving or travelling in a circular path about the vertical axis of the silo and progressively becoming lowered in the silo as the unloading procedure continues. The silage is engaged and delivered by a scraper conveyor to a blower having its outlet in communication with a curved, upwardly extending duct, through which the silage is discharged through one of the usual openings in the lateral wall of the silo. A rotatable connection is provided between the blower and the discharge duct so that the latter may remain oriented toward the silo opening during the revolving movement of the unloader, as is customary in the art.

The principal object of the present invention is to provide improved guide means for the discharge duct so that the same remains properly oriented toward the silo opening, not only during the revolving movement of the unloader, but also during its lowering movement in the silo. Moreover, in instances where the outlet of the blower is horizontally offset from the vertical axis of the silo so that the lower end of the duct connected thereto travels in a circular path about the center of the silo, the guide means in accordance with the invention effectively compensates for movement of the duct toward and away from the silo opening and retains the duct in proper orientation.

Some of the advantages of the invention reside in its simplicity of construction, efficient and dependable operation, and in its adaptability to economical manufacture and installation.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view in fragmentary form, showing the guide means in accordance with the invention applied to a silage unloader with a portion of the silo wall shown in vertical section and illustrating by full lines and by dotted lines, two different horizontally spaced positions of the mechanism;

FIGURE 2 is a fragmentary top plan view of the subject shown in full lines in FIGURE 1;

FIGURE 3 is a view, similar to that shown in FIGURE 1, but illustrating the mechanism in a relatively lowered position;

FIGURE 4 is a sectional detail on an enlarged scale, taken substantially in the plane of the line 4—4 in FIGURE 3;

FIGURE 5 is a fragmentary side elevational view on an enlarged scale, showing the attachment of the duct to the blower;

FIGURE 6 is a top plan view of the subject shown in FIGURE 5;

FIGURE 7 is a fragmentary elevational view, taken in the direction of the arrow 7 in FIGURE 5;

FIGURE 8 is a sectional detail, taken substantially in the plane of the line 8—8 of FIGURE 5; and FIGURE 9 is a fragmentary side elevational view of a slightly modified form of the invention.

Referring now to the accompanying drawings in detail, the general reference numeral 10 designates a silage unloader of the general type disclosed, for example, in my aforementioned prior patent and co-pending application, the same being adapted to rest upon silage in a silo and travel with a revolving movement in a circular path about the vertical axis 11 of the silo. The unloader 10 includes a frame 12 having a silage scraping conveyor 13 in communication with a blower 14 disposed at or adjacent one end of the frame and provided with a vertical outlet 15 which, in the instance shown, is spaced horizontally from the axis 11 so that when the unloader revolves in the silo, the outlet 15 travels in a circular path, as will be readily understood. The outlet 15 is equipped with a rotatable extension 16 provided at one side thereof with a horizontal pivot pin or shaft 17 which serves as a mount for the lower end of an upwardly extending, curved discharge duct 18 of a U-shaped cross-section, best shown in FIGURE 4. By virtue of this arrangement the duct 18 may be raised or lowered about the pivot pin 17 and may remain so that the upper or discharge end 18a thereof is oriented toward one of the usual openings 19 in the lateral wall 20 of the silo, while the unloader 10 is revolving on the silage.

The invention concerns itself with the provision of guiding means for the duct 18 whereby the same remains oriented toward the opening 19 not only while it travels with the blower outlet toward and away from the opening during movement of the blower outlet in the aforementioned circular path, but also while the unloader, including the discharge duct, becomes progressively lowered in the silo as the silage is being unloaded.

These means comprise an elongated, longitudinally curved guide member 21 which, as is best shown in FIGURE 2, is in the form of a U-shaped rod, having a pair of spaced side portions 21a which straddle the duct 18 and a bight portion 21b provided with a screw-threaded coupling 22. A relatively short pipe or nipple 23 extends from the coupling 22 and carries an adapter 24 which is mounted for vertical and horizontal swinging movement on a suitable support member 25 provided in the opening 19. Thus, the guide member 21 may be raised and lowered about the pivot of the adapter 24 on the support member 25.

The guide means also include two pairs of grooved rollers 26, 27, rotatably mounted on studs 28 carried by a pair of straps or plates 29 which are suitably secured to opposite sides of the upper end portion of the duct 18 so that the side portions 21a of the member 21 pass between the rollers 26, 27, as shown, the rollers 26 engaging the top and the rollers 27 engaging the underside of the portions 21a. The rollers engage the portions 21a freely enough to prevent binding but closely enough for the member 21 to effectively control the orientation of the duct at various different positions of the duct relative to the member 21, as will be hereinafter apparent.

Thus, with the mechanism disposed as shown by the full lines in FIGURE 1 and the blower outlet 15 on the side of the axis 11 adjacent the opening 19, the engagement of the rollers 26, 27 with the guide member 21 is such that the discharge end 18a of the duct is directed toward the opening 19 for delivery of silage therethrough. When the unloader revolves through 180° in the silo so that the outlet 15 is disposed at the side of the axis 11 remote from the opening 19, as shown by the dotted lines in FIGURE 1, the member 21 is swung upwardly about the pivot 25 while the rollers 26, 27 move downwardly along the portions 21a, and the outlet 18a of the duct 18 still remains oriented toward the opening 19, as illustrated. Moreover, when the unloader becomes lowered in the silo, for example, to the position shown in FIGURE 3, the coaction between the guide member 21 and the rollers 26, 27 is such that the duct 18 becomes raised and still remains directed toward the silo opening. This raising of the duct gradually continues with the progressive lowering of the unloader in the silo, until a point is reached where discharge through the opening 19 is discontinued and the apparatus rearranged for discharge through the next lower opening, indicated at 19a. It will be also noted that since the extension 16 of the blower outlet 15 moves horizontally toward and away from the silo wall 20 during revolving of the unloader, the horizontal distance of the extension 16 from the wall opening 19 is greater when the device is in the dotted line position shown in FIGURE 1 than when in the position shown by full lines in the same figure. The same also applies to the distance of the discharge end 18a of the duct 18 from the opening 19, and since silage discharged from the duct when in the dotted line position has further to travel to reach the opening 19 than it does when the duct is in the full line position, it is advantageous for the discharge end of the duct to be relatively raised when remote and relatively lowered when close to the silo opening, whereby silage discharged from the duct in its remote and raised position travels in a higher trajectory to properly reach the opening. This raising and lowering of the duct is facilitated and controlled by the guide means 21, 26, 27; the curvature of the rod 21 being such that the discharge end 18a of the duct 18 is raised when remote from the opening 19 and lowered when close to the opening, as will be apparent from a comparison of the full line and dotted line illustrations in FIGURE 1.

Resilient means are provided for biasing the duct 18 to its raised position, these means comprising a pair of inverted cup-shaped sockets or seat 30 which, as is best shown in FIGURE 8, are provided with laterally projecting, screw-threaded studs 31 pivoted in a pair of straps 32. The latter are welded or otherwise secured to opposite sides of the lower end portion of the duct 18 and also carry the aforementioned pivot pin or shaft 17. The pin or shaft 17 is journalled in a tubular bearing 33 carried by an angle bracket or plate 34 which, in turn, is welded or otherwise secured to the extension 16 of the outlet 15. The sockets 30 accommodate a pair of compression springs 35 which bear against the plate 34, thus urging the duct 18 to its raised position. The lower ends of the springs 35 engage upstanding pins 36 provided on the plate 34, whereby displacement of the springs is prevented.

It will be understood that the aforementioned pipe or nipple 23 is removably connected to the socket or coupling 22 and to the adapter 24, so that it may be removed and substituted by another pipe or nipple of a different length, if necessary, to accommodate silos of different diameters.

FIGURE 9 illustrates a slightly modified embodiment of the invention wherein the guide member 40, corresponding to the aforementioned member 21, is in the form of a single, curved rod, engaged by and passing between a pair of rollers 41, 42 mounted in suitable brackets 43 and 44 which are affixed to the duct 18. As such, the rod 40 and brackets 43, 44 may be disposed at the top of the duct as shown, or at one side of the duct, if so preferred. In either event, the connection of the member 40 to the silo and operation of this embodiment are the same as already described.

While in the foregoing there have been described and shown the preferred embodiments of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. The combination of a silo having a lateral wall provided with an opening, a silage unloader positioned in said silo for revolving movement therein, said unloader being adapted to rest upon and operatively engage silage in the silo and including a silage blower having an outlet offset horizontally from the center of the silo whereby said outlet travels in a circular path horizontally toward and away from said opening during revolving of the unloader, an upwardly extending curved discharge duct movably connected at its lower end to the outlet of said blower for revolving movement of the unloader relative to the duct and for swinging movement of the duct in a vertical plane relative to the unloader, the upper end constituting the discharge end of the duct also moving toward and away from the silo opening during revolving of the unloader, and guide means connected to the silo wall and cooperating with said duct for respectively raising and lowering the discharge end thereof during its movement away from and toward said opening, whereby to maintain the trajectory of silage discharged from the duct constantly oriented through said opening.

2. The combination as defined in claim 1 wherein said guide means include an elongated curved guide member and pivot means connecting said one end of said guide member to said lateral wall, said guide member being movable in a vertical plane about said pivot means.

3. The combination as defined in claim 1 wherein said guide means comprise a curved rod pivoted to said silo wall, and a pair of rollers carried by said duct and engaging said rod at diametrically opposite sides of the latter.

4. The device as defined in claim 1 together with resilient means coacting with said blower and with said duct for urging the duct to a raised position.

5. The combination of a silage unloader adapted to be positioned in a silo for revolving movement therein while resting upon and operatively engaging silage in the silo, said unloader including a blower having an eccentrically offset outlet spaced horizontally from the center of the silo whereby said outlet travels in a circular path during revolving of the unloader, an upwardly extending curved discharge duct movably connected at its lower end to the outlet of said blower for revolving movement of the unloader relative to the duct and for swinging movement of the duct in a vertical plane relative to the unloader, the upper end constituting the discharge end of said duct moving horizontally toward and away from an opening in the silo during revolving of the unloader, and guide means adapted to be connected to the silo and cooperating with said duct for respectively raising and lowering the discharge end thereof during its movement away from and toward the stated silo opening, whereby to maintain the trajectory of silage discharged from the duct constantly oriented through the stated opening.

6. The device as defined in claim 5 wherein said guide means include an elongated curved guide member adapted to be pivoted at one end thereof to the silo, and a pair of rollers carried by said duct and engaging said guide member at diametrically opposite sides intermediate the ends of the latter.

7. The device as defined in claim 5 together with resilient means coacting with said blower and with said duct for urging the duct to its raised position.

8. The combination of a silo having a lateral wall provided with an opening, a silage unloader positioned in said silo for both revolving and lowering movement therein, said unloader being adapted to rest upon and operatively engage silage in the silo and including a silage conveyor, a blower at one end of said conveyor having an outlet offset horizontally from the center of the silo whereby said outlet travels in a circular path horizontally toward and away from said opening during revolving of the unloader, an upwardly extending curved discharge duct movably connected at its lower end to the outlet of said blower for revolving movement of the unloader relative to the duct and for swinging movement of the duct in a vertical plane relative to the unloader, the upper end constituting the discharge end of the duct also moving toward and away from the silo opening during revolving of the unloader, and guide means connected to the silo wall and cooperating with said duct for respectively raising and lowering the discharge end thereof during its movement away from and toward said opening whereby to maintain the trajectory of silage discharged from the duct constantly oriented through said opening, said guide means comprising an elongated guide member disposed adjacent said duct, pivot means connecting one end of said guide member to said silo wall for swinging movement in a vertical plane, a pair of rollers provided on said duct and engaging said guide member at opposite sides intermediate the ends of the latter, and resilient means coacting with said blower and with said duct for urging the same to its raised position.

References Cited in the file of this patent

UNITED STATES PATENTS

| | | |
|---|---|---|
| 2,580,306 | Leach | Dec. 25, 1951 |
| 2,595,333 | Clapp | May 6, 1952 |
| 2,678,241 | Miller | May 11, 1954 |
| 2,788,247 | Chapman | Apr. 9, 1957 |
| 2,877,907 | Bushbom | Mar. 17, 1959 |